United States Patent
Rahman

(10) Patent No.: US 6,445,916 B1
(45) Date of Patent: Sep. 3, 2002

(54) WIRELESS SYSTEM AND METHOD FOR EVALUATING QUALITY OF SERVICE

(75) Inventor: Mohamed Anisur Rahman, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/226,612

(22) Filed: Jan. 7, 1999

(51) Int. Cl.[7] ................................................ H04Q 7/20
(52) U.S. Cl. ...................... 455/423; 455/424; 455/425; 455/512; 455/513; 709/226
(58) Field of Search .............................. 455/450, 423, 455/424, 425, 512, 513, 422, 8, 9, 509, 453, 522, 553; 370/489, 329, 338, 348; 709/224, 285, 226, 238; 325/220; 379/100.04, 114, 100.01, 115, 111

(56) References Cited

U.S. PATENT DOCUMENTS

| | | | | |
|---|---|---|---|---|
| 5,729,542 A | * | 3/1998 | Dupont | 370/346 |
| 5,745,480 A | * | 4/1998 | Behtash et al. | 370/252 |
| 5,752,193 A | * | 5/1998 | Scholefield et al. | 455/452 |
| 5,898,763 A | * | 4/1999 | Azuma et al. | 379/100.04 |
| 6,011,778 A | * | 1/2000 | Kilkki et al. | 370/232 |
| 6,047,326 A | * | 4/2000 | Kilkki | 709/228 |
| 6,055,571 A | * | 4/2000 | Fulp et al. | 709/224 |
| 6,078,818 A | * | 6/2000 | Kingdon et al. | 455/456 |
| 6,131,049 A | * | 10/2000 | Marsan et al. | 455/574 |
| 6,134,453 A | * | 10/2000 | Sainton et al. | 455/553 |
| 6,201,971 B1 | * | 3/2001 | Purnadi et al. | 455/450 |
| 6,260,067 B1 | * | 7/2001 | Barnhouse et al. | 709/224 |

* cited by examiner

Primary Examiner—Daniel Hunter
Assistant Examiner—Pablo N Tran
(74) Attorney, Agent, or Firm—Harness, Dickey & Pierce, PLC

(57) ABSTRACT

A method for evaluating quality of service for billing purposes in a wireless communications system includes establishing a target quality of service level for a subscriber station; expending resources of the wireless communications system at a resource level to maintain the established target quality of service level; measuring the actual quality service level over the measuring interval to characterize the actual quality of service with respect to the target quality of service level as a compliant interval or a non-compliant interval temporally coextensive with the measuring interval.

40 Claims, 11 Drawing Sheets

MAPPING BETWEEN DELAY IN PACKET SCHEDULING AND QUALITY

007
WIRELESS SYSTEM AND METHOD FOR EVALUATING QUALITY OF SERVICE

FIELD OF THE INVENTION

The invention relates to a system and method for evaluating quality of service in wireless communication system for voice traffic, data traffic, or both.

BACKGROUND OF THE INVENTION

Since the introduction of cellular systems and other wireless communication systems, service providers have generally billed subscribers' use of communication resources on a timed basis. Accordingly, a typical wireless communication system computes billing records based on call durations of subscribers.

One problem with billing solely based upon call duration is that subscribers may be billed for unusable time. Unusable time refers to any time during which the communication system does not function with sufficient reliability to meet an expected quality of service for one or more subscribers. For example, unusable time is present when a subscriber transiently passes through a dead-spot in radio frequency coverage and loses a portion of a conversation. Similarly, unusable time is present when interference degrades call quality so that a subscriber tries to communicate against a backdrop of static, noise, cross-talk, or garbled signals. Nevertheless, communication systems, which evaluate billing solely based upon call duration, often lack the capability to reduce or eliminate charges for unusable time, possibly leading to the loss of wireless customers.

Another problem with present wireless communication systems is that often only one quality standard of service is offered for a myriad of subscribers with divergent communication needs. Some subscribers with lower incomes or indifference to quality, may desire less expensive wireless communication services for voice traffic. For example, college students may desire low-tier voice wireless service, while executives may desire a high-tier or high-fidelity voice wireless service. Therefore, a need exists for a wireless communications system that supports billing records for different levels of voice quality service for subscribers.

Yet another problem of present wireless communication systems concerns reliability issues associated with wireless data applications. As potential data traffic applications proliferate on wireless communications systems, businesses may desire wireless data access with premium reliability. Data subscribers, who engage in data transmissions, may prove to be even more demanding of transmission quality than voice subscribers, who solely engage in voice transmissions. Therefore, a need exists for a wireless communications system that supports billing records for different levels of data quality service for subscribers.

Measuring quality of service on wireless communication systems presents unique challenges. The actual quality of service within a wireless communication system tends to fluctuate continually. Fluctuations may be caused by radio frequency propagation, subscriber movement, mobility management, limited radio resources, and fluctuating network conditions, among other factors. Maintaining a negotiated level of quality of service is difficult in such a dynamic quality of service environment. Thus, a need exists for a communication system featuring a quality of service evaluation that can reliably operate in a changeable quality of service environment.

SUMMARY OF THE INVENTION

In accordance with the invention, a communications system and method allows a system operator to establish a target quality of service level for a corresponding subscriber. The target quality of service is preferably selected from a hierarchy of standard quality of service levels. A subscriber may chose the target level of service appropriate for the subscriber's communication requirements, such as voice requirements, data requirements, or even packet-data requirements. Communication system resources are expended to attempt to maintain the target quality, despite fluctuations in factors opposing maintenance of the target quality. An actual measured quality of service is evaluated for compliance to the established target quality of service. Because a billing record preferably reflects the actual measured quality of service, rather than call duration alone, customer satisfaction involving billing may be improved. Characterizing actual quality of service as noncompliant or compliant intervals permits objective identification and tracking of unusable time. The wireless communications system and method supports billing records for different levels of voice quality or data quality to accommodate divergent communication requirements of subscribers.

In a preferred embodiment, an accurate billing record may be generated even in a dynamic quality of service environment, because the communications system continuously or periodically measures both expended resources and actual performance for a corresponding subscriber. Even if the communication system fails to measure or inaccurately measures the actual performance associated with a subscriber, billing integrity is preserved through the measurement of expended resources as a dynamic indicator of the provided quality of service for the subscriber. The measurement of expended resources provides a baseline for comparison against the measured actual performance. Thus, the combined measurements of resource use data and system performance data during a common measuring interval for a subscriber enhance billing reliability and billing flexibility for wireless service providers.

DETAILED DESCRIPTION OF THE PREFERRED EMBODIMENTS

The present invention relates to a method and system for evaluating quality of service in a communications system. Quality of service parameters (i.e. quality parameters) are any parameters associated with the communication system that indicate quality which is either perceptible directly to a human subscriber or perceptible through the use of test and measurement equipment adapted to test the communications system from a subscriber station's point of view. For example, quality of service parameters include bit-error rate (BER), frame error rate, signal-to- interference ratio, and signal-to-noise ratio for digitally modulated signals.

In accordance with a preferred embodiment of the invention, the quality of service parameters may differ from voice traffic to data traffic. If voice traffic is predominately carried by circuit switching, rather than packet switching, the bit-error rate and the frame-error rate are the quality parameters of predominate importance for voice traffic. In contrast, packet data traffic may consider the quality of service parameter called packet scheduling delay interval and available packet size. The packet scheduling delay interval is the delay between the transmission of packets (i.e. bursts) over the communication system. The shorter the packet scheduling delay interval, the better chance that the subscriber station will be able to accomplish data-dependent tasks in real-time.

In a preferred embodiment, both downlink performance and uplink performance for a corresponding subscriber may be used together as quality of service parameters, regardless of any variation between an uplink quality parameter and a downlink quality parameter for a corresponding subscriber during the same measuring interval. Alternately, the operator is permitted to select a worst case between the downlink performance and the uplink performance as a predominate or sole quality parameter. For example, if the actual measured bit-error rate for the uplink channel is lower than the actual measured bit-error rate for the downlink channel, the subscriber's quality of service may be determined based upon the uplink bit-error rate alone, because here the uplink is assumed to be the predominate limiting factor in the radio frequency coverage.

First Embodiment of Communications System

Figure 1:
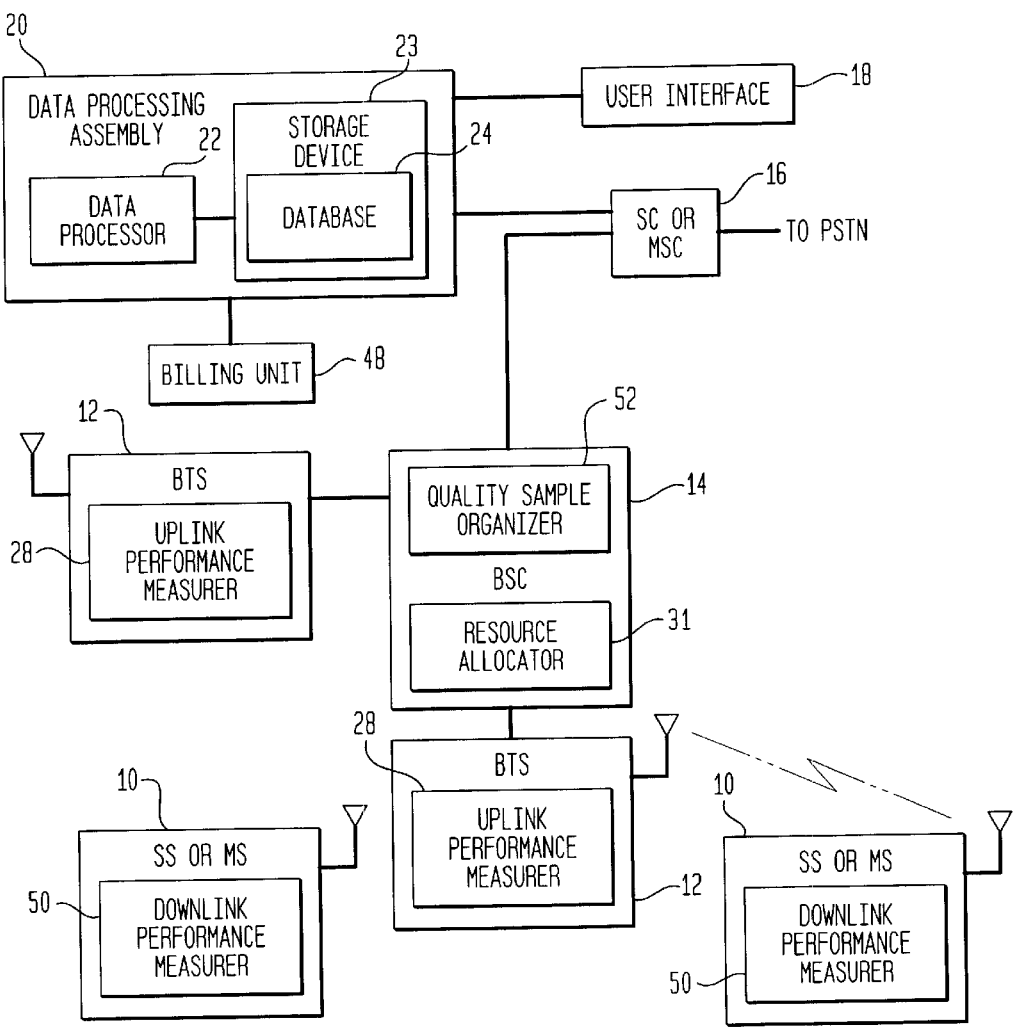
FIG. 1 is a block diagram of a first embodiment of a communications system in accordance with the invention.

FIG. 1 illustrates a first embodiment of a communications system for practicing the method of the present invention. The communications system of FIG. 1 comprises subscriber stations 10 (SS) and a fixed end. The fixed end preferably includes one or more base stations 12 (i.e. BTS's), a base station controller 14 (BSC), a mobile switching center 16 (MSC), a user interface 18, a data processing assembly 20, and a billing unit 48. One or more base stations 12 are coupled to the base station controller 14 through communication lines for carrying both subscriber traffic and control data. The base station controller 14 is coupled to the mobile switching center 16 to provide communications to any subscriber or other telecommunications user capable of being in communication with the mobile switching center 16. The mobile switching center 16 is coupled to the data processing assembly 20 for processing, storing, and retrieving quality data or billing records for the subscribers. A user interface 18 is preferably coupled to the data processing assembly 20 to allow a system operator to process, store, or retrieve the quality data in the data processing assembly 20. The data processing assembly 20 preferably interfaces with a billing unit 48 for generating subscriber bills based on quality of service data available from the data processing assembly 20.

The subscriber stations 10 generally comprise transceivers for radio frequency communication with the base station 12. In a preferred embodiment, the subscriber stations 10 comprise mobile units or any commercially available mobile phones compatible with the fixed end. The subscriber stations 10 preferably include a downlink performance measurer 50 for measuring at least one signal quality parameter of a downlink path from the base station 12 to the subscriber station 10.

The downlink performance measurer 50 comprises any applicable test device that provides measurement of a suitable signal quality parameter. In a preferred embodiment, the downlink performance measurer 50 for measuring a signal quality parameter comprises a bit-error rate (BER) tester. In an alternate embodiment, the downlink performance measurer 50 includes one or more of the following test devices: a bit-error rate tester, a frame-error rate (FER) tester, a word-error rate (WER) tester, a signal-to-interference ratio (SIR) tester, a signal-to-noise ratio (S/N) tester, a radio frequency signal strength meter, and a radio signal strength indicator. The downlink performance measurer 50 sends the quality parameters as measured quality samples to quality sample organizer 52 in the base station controller 14 via an uplink signal path to the base station 12. The downlink quality samples are typically sent from the subscriber station 10 to the base station 12 over an overhead channel, a control channel, an access channel, or the like. The base station 12 conveys the quality samples to the quality sample organizer 52.

The downlink performance measurer 50 preferably differs from voice channel applications to data channel applications. However, for voice channel applications and data channel applications, the downlink performance measurer 50 preferably comprises a bit-error rate tester (BERT). For data channel applications, the downlink performance measurer 50 further includes timers in addition to the BERT. The timers include a first timer and a second timer. A first timer (not shown) measures a packet interval and a second timer (not shown) measures a packet scheduling delay between adjacent packet intervals for the subscriber. The first and second timers are optimally associated with a decoder to trace which packets are associated with each subscriber by decoding the packets for subscriber identifiers, internet protocol addresses, or the like.

In practice, an input of the downlink performance measurer 50 may be coupled to a demodulator output or a discriminator output of the subscriber station 10, although other interconnection schemes are possible and fall within the scope of the invention. A digital filter may be coupled to an output of the downlink resource measurer 50 to smooth the output waveform of the downlink performance measurer 50. An analog-to-digital converter may be required to interface the downlink performance measurer 50 to the digital filter or the subscriber station 10, as is known to those skilled in the art.

A base station subsystem includes the base station 12 and the base station controller 14. The base station 12 generally comprises a base transceiver station (BTS) for communication with one or more subscriber stations 10 via radio frequency traffic channels. In practice, multiple base stations may be co-located at a single site or multiple sites to meet the capacity requirements of subscriber stations based on the predicted or anticipated subscriber use of the communication system.

The base station 12 includes an uplink performance measurer 28. The uplink performance measurer 28 comprises any applicable test device that provides measurement of a suitable signal quality parameter. In a preferred embodiment, the uplink performance measurer 28 for measuring a signal quality parameter comprises a bit-error rate tester. In an alternate embodiment, the uplink performance measurer 28 includes one or more of the following test devices: a bit-error rate tester, a frame-error rate (FER) tester, a word-error rate (WER) tester, a signal-to-interference ratio (SIR) tester, a signal-to-noise ratio (S/N) tester, a radio frequency signal strength meter, and a radio signal strength indicator.

The uplink performance measurer 28 and the downlink performance measurer 50 are equipped to measure one or more of the same signal quality parameters. For example, if the downlink performance measurer 50 is capable of measuring signal-to-interference ratio, then the uplink performance measurer 28 should be capable of measuring signal-to-interference ratio during the same measuring interval as the donwlink performance measurer does. Moreover, in a preferred embodiment an uplink quality sample and a downlink quality sample are simultaneously measured with substantially equal sample durations at the uplink performance measurer 28 and the downlink performance measurer 50 associated with a subscriber station 10.

The uplink performance measurer 28 sends the quality parameters as measured quality samples to the quality sample organizer 52 in the base station controller 14 via a communication line or interconnection interconnecting the base station 12 to the base station controller 14.

The uplink performance measurer 28 preferably differs from voice channel applications to data channel applications. However, for voice channel applications and data channel applications, the uplink performance measurer 28 preferably comprises a bit-error rate tester (BERT). For data channel applications, the uplink performance measurer 28 further includes timers in addition to the BERT. A first timer (not shown) measures a packet interval and a second timer (not shown) measures a packet scheduling delay between adjacent packet intervals for the subscriber. The first and second timers include a decoder for tracing which packets are associated with each subscriber by decoding subscriber identifiers, internet protocol addresses, or the like.

In practice, an input of the uplink performance measurer 28 may be coupled to a demodulator output or a discriminator output of the base station 12, although other interconnection schemes are possible and fall within the scope of the invention. A digital filter may be coupled to an output of the uplink resource measurer to smooth the output waveform of the uplink performance measurer 28. An analog-to-digital converter may be required to interface the uplink resource measurer to the digital filter or the subscriber station 10, as is known to those skilled in the art.

The base station controller 14 controls channel assignment activity and access to the communication system. The base station controller 14 may form an integral part of the base station 12, rather than a separate device. The base station controller 14 interfaces the base station 12 to a mobile switching center 16 (MSC). The base station controller 14 contains a resource allocator 31 for allocating base station resources to the subscriber stations 10 based on system demand and other constraints. The base station controller 14 includes the quality sample organizer 52 which collects actual measured samples of quality parameters from the downlink performance measurer 50 and the uplink performance measurer 28. The quality sample organizer 52 organizes the downlink performance measurements and uplink performance measurements such that downlink and uplink measurements for the same subscriber and the same measuring interval correspond to each other. The quality sample organizer 52 also organizes the data in a suitable format for transmission to the data processing assembly 20 via the mobile switching center 16.

The mobile switching center 16 (MSC) preferably comprises any telecommunications switch for routing, interconnecting, and circuit switching of telecommunication channels. Alternately, the MSC 16 may provide packet switching of the telecommunications data, or both packet switching and circuit switching on separate ports. The MSC 16 preferably services channel traffic between a telecommunications network (i.e. Public Switched Telephone Network)and the communication system. The MSC 16 performs call connection control and mobility management. The mobile switching center 16 includes any telecommunications switch applicable to a digital wireless system, a digital cellular system, a spread-spectrum wireless system, a spread-spectrum wireless local loop system (WLL), a Code-Division-Multiple-Access (CDMA) system, or the like.

The communications system preferably includes a data processing assembly 20 for recording a subscriber identifier (i.e. Mobile Identification Number) corresponding to a subscriber, the measuring interval, the target quality of service, and actual quality of service corresponding to the subscriber. The measuring interval is a time period during which one or more quality samples are taken by the uplink performance measurer 28, the downlink performance measurer 50, or both. The target quality of service and the actual provided (i.e. measured) quality of service may represent a bit-error rate, another quality parameter, or a group of quality parameters.

The data processing assembly 22 generally includes a data processor 22, a storage device 23, and a database 24. The data processor 22 manages the database 24, data transfer to the database 24 and data retrieval from the database 24. The data processor 22 controls the storage device 23 which stores the database 24. The user interface 18 cooperates with the data processor 22 to process, store, and retrieve target quality of service levels, subscriber identities, and other data for subscriber billing records in the database 24.

In an alternate embodiment, a data processing assembly records a subscriber identifier for the subscriber, the target quality of service, and data indicative of compliance or noncompliance of the actual quality of service. The data indicative of compliance or noncompliance can readily be stored in a field with two permissible states, which promotes efficient data storage in a storage device.

The billing unit 48 comprises any device for billing subscribers based on a quality of service record available from the data processing assembly 20. In a preferred embodiment, each subscriber has a corresponding provided quality of service record and a target quality of service for a billing period. While the format for the quality of service record is preferably provided in compliance or partial compliance with the Automated Method Accounting (AMA) standard, the quality of service record may be formatted into another billing format. Automated Method Accounting (AMA) is an illustrative example of a billing record format frequently used in telecommunications systems in the U.S.

The quality sample organizer 52 may provide the service provider with raw quality of service data even after formatting so that the service provider has the flexibility in calculating subscriber bills from the quality of service data in accordance with the service provider's preferences. Further, the wireless service provider has the option of providing billing allowances where an actual provided quality of service does not meet or exceed the target quality of services. Potential unusable time is readily identifiable upon inspection of the noncompliant measuring interval for a subscriber. Thus, the method and system of the present invention may promote appropriate settling of billing disputes and greater customer satisfaction concerning billing procedures.

Quality of Service Levels

The user interface 18 allows an operator or technician to enter a target quality of service level corresponding to each subscriber into the database 24. The operator is able to define a hierarchy of standard levels or accept a default definition of hierarchy of standard levels. Each standard level represents a grade defined by a range of a quality parameter. Each standard level may have a lower limit and an upper limit, a lower limit alone (e.g., highest defined standard level of signal-to-noise ratio), or an upper limit alone (e.g., lowest defined standard level of signal-to-noise ratio). In accordance with a preferred embodiment, several grade hierarchies are illustrated in FIG. 2 through FIG. 4 including a standard voice grade hierarchy (FIG. 2), standard data grade hierarchy (FIG. 3) and a packet data grade hierarchy (FIG. 3 and FIG. 4).

The operator assigns one or more grade hierarchies to a subscriber. Further, the operator defines a target quality of service within each assigned grade hierarchy. The user interface 18 and the data processing assembly 20 allow the operator to select a target quality of service commensurate with a standard quality level, which is desired or requested by a subscriber. For illustrative purposes, eight discrete standard quality levels, represented by nonnegative integers, are presented in each of FIG. 2 and FIG. 4, although in practice any number of quality level s may be used.

The user interface 18 and data processing assembly 20 cooperate with the remainder of the communication system so as to permit efficient use of limited communication resources by offering quality of service schemes that are appropriately tailored to a subscriber's use of data service, voice service, or both. Supporting different quality level s for data and voice service avoids providing too high of a quality level for voice subscribers that would otherwise unnecessarily deplete the communication system resources of the invention.

Figure 2:
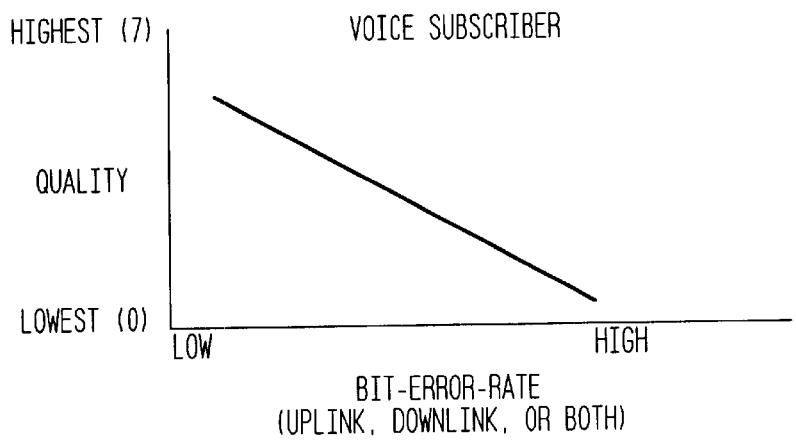
FIG. 2 is a graph of signal quality level versus bit error rate for a voice channel in accordance with the invention.
Figure 3:
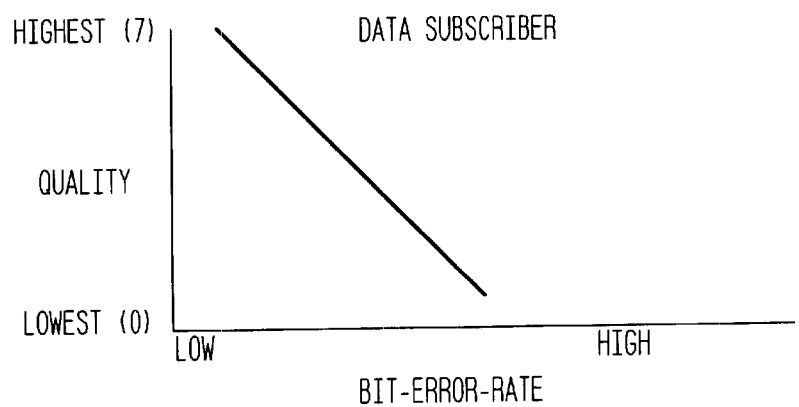
FIG. 3 is a graph of signal quality level versus bit error rate for a data channel in accordance with the invention.
Figure 4:
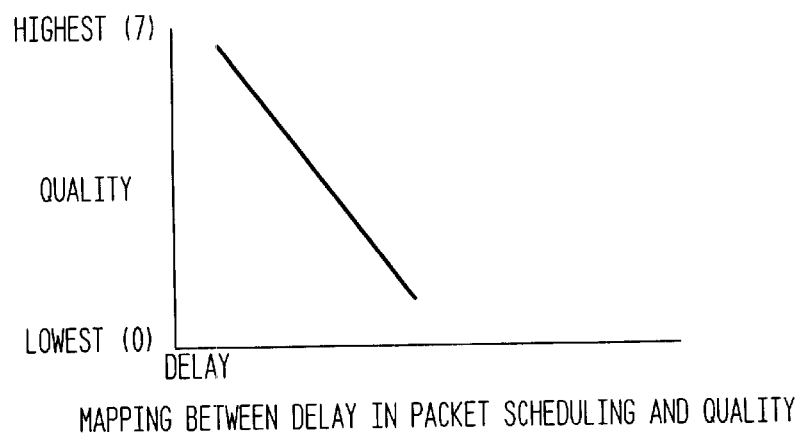
FIG. 4 is a graph showing an illustrative relationship of quality level versus packet scheduling delay for a packet data service on a communications system in accordance with the invention.

In FIG. 2 and FIG. 3, as the bit error rate decreases, the quality of service level generally increases from a lowest standard quality level (i.e. zero) to a highest standard quality level (i.e. seven). The vertical axis represents standard quality levels and the horizontal axis represents bit error ratio. Each of FIG. 2 and FIG. 3 may represent standard quality level versus a bit error rate for a downlink path from the base station 12 to the subscriber station 10, for an uplink path from the subscriber station 10 to the base station 12, or for an average of both the uplink path and the downlink path.

The function shown in FIG. 2 is optimized for a subscriber using a voice channel, while the function, with the steeper slope, in FIG. 3 is optimized for a subscriber using a data channel. Subscribers using the communications system primarily for voice communications are often more tolerant of lower absolute data quality than subscribers using communication systems predominately for data communications.

FIG. 4 shows standard quality level versus packet scheduling delay for a subscriber using a packet data transmission service. The vertical axis represents standard quality level. The horizontal axis represents packet scheduling delay. The highest standard quality level has the lowest scheduling delay. As the standard quality level decreases the scheduling delay increases. As scheduling delay increases, the subscriber may encounter data through-put problems.

In a preferred embodiment where packet scheduling delay is used as a signal quality parameter, the packet size is limited to a preferred maximum size for all users. The service provider selects an optimum packet size less than the maximum size based on data traffic and/or voice traffic. For example, the packet data size may be tailored for TCP/IP (Transmission Control Protocol/Internet Protocol) applications to optimize throughput. Packet size is related to burst length. For the data users, once the packet size is limited, the packet scheduling delay then becomes a primary consideration for quality of service.

In practice, a combination of the data grade hierarchy of FIG. 3 and the packet data hierarchy of FIG. 4 may be used for packet data service such that a packet data subscriber has first target in FIG. 3 corresponding to a target bit-error rate and a second target in FIG. 4, corresponding to a target packet delay. A combination of the first target and the second target or any other group of targets for a single subscriber may be referred to as an aggregate target. Each subscriber's target quality of service or aggregate target is generally independent of all other subscribers.

Example of a Method of Evaluating Quality of Service

Figure 5:
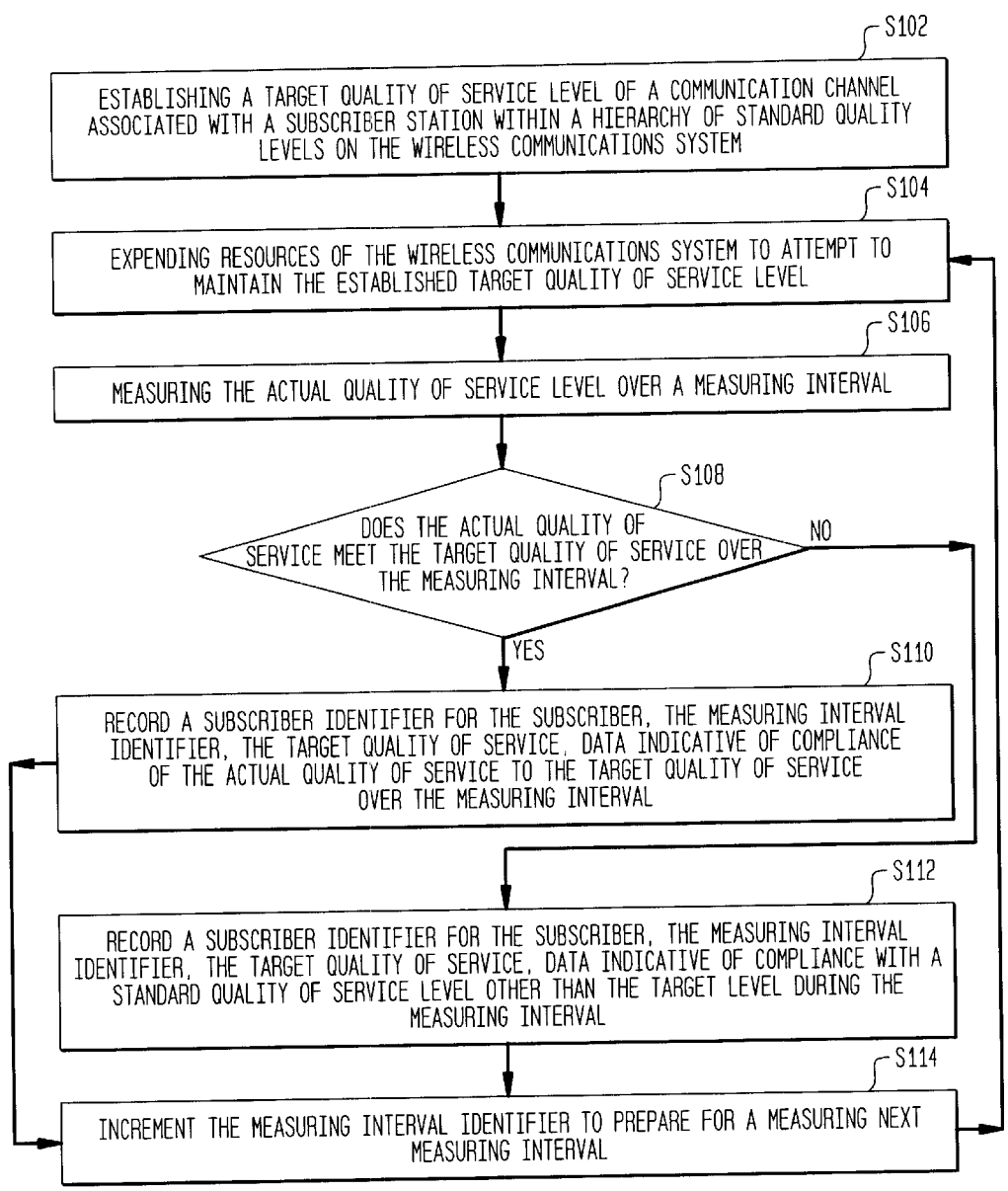
FIG. 5 is a flow chart illustrating an example of providing a quality of service evaluation to subscribers of a communication system in accordance with the invention.

FIG. 5 shows an example of a method of evaluating quality of service, in accordance with the invention. The method starts in step S102. In step S102, a system operator establishes a target quality of service level of a communications channel associated with a subscriber station 10. The target quality is selected from a group of standard quality levels in a hierarchy of standard quality levels for the wireless communication system. The operator may establish the hierarchy prior to step S102 or select a default definition for the hierarchy provided as software instructions to the data processing assembly 20. Recall that FIG. 2 through FIG. 4 depict illustrative examples of grade hierarchies of standard quality levels, which may be used in step S102.

In step S104, the wireless communication system expends communication resources to attempt to maintain the established target quality of service level. For example, the base station subsystem may control radio frequency power output of the base station 12 or receiver amplifier gain to compensate for fluctuations in radio frequency transmissions. Many power control schemes that are provided with commercially available communication systems are well-suited for approaching or maintaining the target quality. Alternatively, the base station subsystem may select from error correction schemes (i.e. forward error correction (FEC), cyclical redundancy check (CRC), etc.) having various degrees of robustness to improve reliability and decoding of transmitted information.

In step S106, the actual quality of service level is measured by a downlink performance measurer 50, an uplink performance measurer 28, or both over a measuring interval. The measuring interval is a suitably long sample time for obtaining a reliable and meaningful sample of a radio frequency transmission. The measurement of the actual quality of service is based upon the same quality parameter as the target quality of service. For example, the quality parameter measured, for purposes of step S106, may be the bit-error rate.

The measured actual quality of service is transmitted from the uplink performance measurer 28, the downlink performance measurer 50, or both to the quality sample organizer 52. The measured actual quality of service preferably includes uplink performance data and downlink performance data. The uplink performance data and the downlink performance data comprise data samples. The quality sample organizer 52 may process, format, or organize the data samples prior to transmission to the data processing assembly.

In step S108, the data processing assembly 20 determines whether or not the actual quality of service meets the target quality of service over the measuring interval. For example, the data processing assembly 20 determines if an actual measured bit-error rate substantially complies with a target bit-error rate. As used herein, the bit-error rate refers to the ratio between the mean number of errors during the measuring interval and the total number of bits during the measuring interval. The target quality of service may be defined as a signal quality range bounded by a lower limit and an upper limit, a lower limit alone, or an upper limit alone. If the signal quality range is a bit-error rate, the range may cover a multiplicative factor of 10 or 1/10 between the lower limit and the upper limit. However, the signal quality range corresponding to the target quality of service may vary from one signal quality parameter to another by factors other than the above multiplicative factor.

In a preferred embodiment, if the actual quality of service meets the target quality of service, then the method continues with step S110. In step S110, the data processing assembly 20 records a subscriber identifier (e.g., MIN) for the subscriber, a measuring interval identifier, the target quality of service (optional), and data indicative of compliance of the actual quality of service to the target quality of service over the measuring interval.

If the actual quality of service exceeded the target quality of service, then the quality of service is compliant from the subscriber's point of view. However, the service provider may view higher than required quality of service as a waste of system resources. Accordingly, an actual quality of service that exceeds the target quality of service may be classified into any standard level of service exceeding the target level for subsequent reference by the service provider.

If the actual quality of service did not meet the target quality of service in step S108, the method proceeds with step S112. The actual quality of service does not meet the target quality of service in step 108 if the actual quality of service is less than a quality sample range corresponding to the target quality of service by a predetermined tolerance. In step S112, the data processing assembly 20 records a subscriber identifier for the subscriber, the measuring interval identifier, the target quality of service (optional), and data indicative of compliance with a standard quality of service level other than the target level during the measuring interval.

The actual quality parameter measured at the uplink performance measurer 28, the downlink performance measurer 50, or both may fluctuate. If the actual quality parameter fluctuates to yield a dynamic actual quality of service for each subscriber station 10, the data processing assembly 20 records such fluctuations in the actual measured quality of service, subject to a filtering response of the filter in the uplink performance measurer 28, of the downlink performance measurer 50, or of both. Further, a processor 22 of the data processing assembly 20 preferably categorizes the actual measured quality of service for each subscriber station 10 per each measuring interval with respect to the standard grade levels. The measuring interval represents a temporal subdivision of a call duration of the subscriber.

The functionality of the data processing assembly 20 is best understood with reference to the following example. After a call is completed for a subscriber station 10, the database 24 may contain the following information for a subscriber station identifier: a first standard level of service for 10% of the call duration, a second standard level of service for 20% of the call duration, and a third standard level service for 70% of the call duration, wherein the target quality equals the third standard level of service. The data processing system optimally sums such standard level classifications by percentage of call duration for all calls during the billing period to calculate similar statistical parameters for each subscriber during an entire billing period.

Following step S110 or step S112, the method continues with step S114. In step S114, the data processing assembly 20 increments the measuring interval identifier to prepare for measuring the next measuring interval by first returning to step S104.

Second Embodiment of a Communications System

Figure 6:
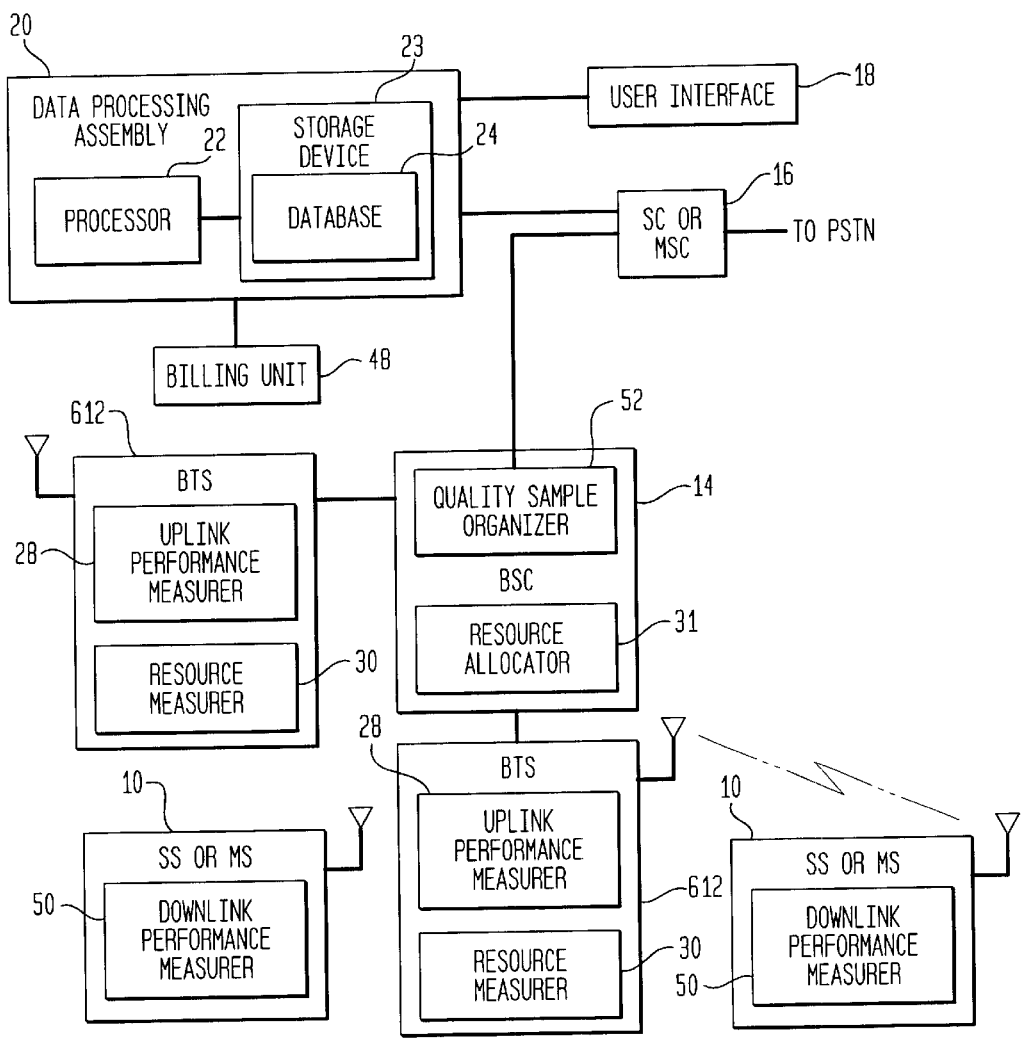
FIG. 6 is a block diagram of a second embodiment of a communications system in accordance with the invention.

FIG. 6 illustrates a second embodiment of a communications system for practicing the method of the present invention. The second embodiment of FIG. 6 is similar to the first embodiment of FIG. 1, except FIG. 6 replaces base station 12 with base station 612. Base station 612 of FIG. 6 represents base station 12 of FIG. 1 equipped with a resource measurer 30.

Figure 7:
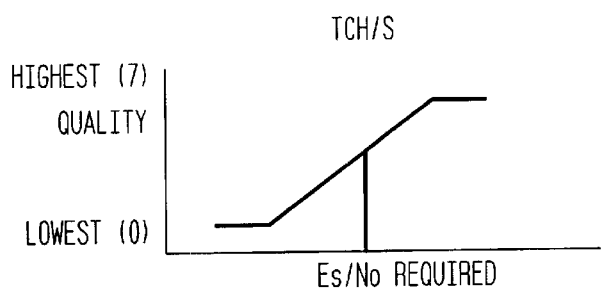
FIG. 7 is a graph of signal quality level versus signal-to-noise ratio for a voice channel in accordance with the invention.
Figure 8:
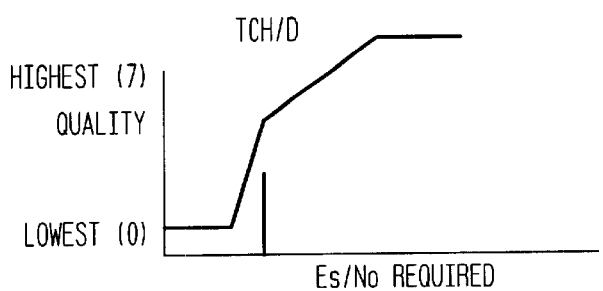
FIG. 8 is a graph of signal quality level versus signal-to-noise ratio for a data channel in accordance with the invention.

The communications system of FIG. 6 preferably uses quality hierarchies defined in terms of signal-to-interference ratio for data and voice communications, although any suitable quality parameters could be used in practice. FIG. 7 shows a standard quality levels versus signal-to-interference ratio (or signal-to-noise ratio) for a voice channel of a subscriber. FIG. 8 shows a standard quality levels versus signal-to-interference ratio (or signal-to-noise ratio) for a data channel.

Accordingly, a subscriber using the communications system of FIG. 6 has a target quality of service level selected from the standard quality levels depicted in FIG. 7 for voice communication or from FIG. 8 for data communication. In an alternate embodiment, a soft target quality of service may be defined in terms of meeting a target signal-to-interference ratio a certain percentage of the time (e.g., ninety-percent of the time) to compensate for inherent fluctuation in the actual measured quality of service.

The resource measurer 30 is integrated into or coupled to a corresponding base station 612. The resource measurer 30 measures the resources expended over a measuring interval to maintain or approach the established target quality service level. The measured resource level generally indicates energy consumption or power consumption of a base station channel associated with a subscriber station 10. The measured resource level informs an operator of the effort that the communication system uses to service each individual subscriber.

The resource measurer 30 measures resource data on a per subscriber basis. The resource data is preferably measured at a sampling rate over the measuring interval, although in alternate embodiments measurements may occur on a continuous basis. The resource data may be characterized by resource levels. The resource measurer 30 measures one or more of the following illustrative examples of resource data: signal strength data, downlink signal strength data, uplink signal strength data, changes in transmitted signal strength data, number or frequency of changes in transmitted signal strength data, signal-to-interference ratio, changes in signal-to-interference ratio, number or frequency of changes in signal-to-interference ratio, differential amplitude changes in signal strength, power consumption of an RF power amplifier associated with a base station 612 for supporting a corresponding subscriber station 10, and power consumption of an RF drive amplifier associated with a base station 612 for supporting a corresponding subscriber station 10. The power consumption analysis considers the power consumption of each subscriber channel independently from all other subscriber channels.

In general, the resource measurer 30 includes power test equipment coupled to the base station 612 for the monitoring power consumption of the base station 612, on a per subscriber basis, for supporting active subscriber stations. Power test equipment for measuring radio frequency (RF) power consumption at the base stations 12 on a per subscriber basis is well-suited as the resource measurer 30. For example, the resource measurer 30 may include a radio frequency signal strength meter capable of measuring transmitted radio frequency signal strength over a channel on a per subscriber basis, during the measuring interval.

In a preferred embodiment, the resource measurer comprises a radio frequency power meter coupled to an integrator for summing the total power consumption of the downlink transmission to the subscriber.

In an alternate embodiment, the resource measurer comprises power test equipment for measuring the direct current (DC) power consumption of a driver RF amplifier or an RF power amplifier associated with a base station to the extent that the RF driver or the RF power amplifier expends energy to service a corresponding subscriber station. The resource measurer preferably includes a receiver for monitoring subscriber traffic to distinguish the power consumption attributed to each subscriber at the base station from all other subscribers.

In another alternate embodiment, the resource measurer comprises a spectrum analyzer capable of providing an amplitude versus frequency profile for a downlink transmission associated with one or more subscribers.

In yet another alternate embodiment, the resource measurer comprises a counter receiving power level control data from a base station subsystem and counting a frequency of power level changes called amplitude differentials. If the amount of the amplitude differentials are not known, an amplitude measurer measures the amplitude differentials to calculate a billing record which allows the subscriber to be billed proportionally to the subscriber's use of communication resources. However, if the amplitude differentials are defined as uniform steps in the communication system, the amplitude measurer is not required.

Figure 9:
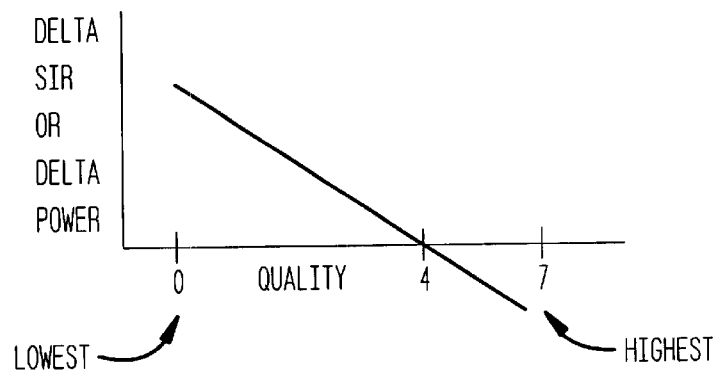
FIG. 9 is a graph of change in power versus signal quality level in accordance with the invention.

FIG. 9 shows a change in power or change in signal-to-interference ratio versus quality. The vertical axis represents a change in power or a change in signal-to-interference ratio. The horizontal axis ranges from a lowest standard quality level to a highest standard quality level. The standard quality values may be represented by nonnegative integer steps. According to the graph of FIG. 9, changes in power are highest both for the lowest target quality level and the highest target quality level. Changes in power are higher for higher target quality levels than intermediate quality levels because the communications system is expending resources to counteract signal propagation fluctuations and other problems. In addition, the power control algorithm may both increase power to increase the subscriber's reliability and reduce power to reduce interference to other subscribers when acceptable. Accordingly, for the highest target quality levels, power changes tend to be frequent and cyclical to maintain the high target quality level without unduly interfering with other subscribers on the communications system.

Conversely, power changes may be frequent to maintain the lowest quality level without loosing the communication channel completely. Thus, in practice, a service provider may elect not to provide the lowest signal quality levels from level zero to level 3. Instead, the service provider may chose to provide level 4 through 7, so the service provider can bill proportionally to the subscribers use of system resources in a manner that enhances the subscriber's radio frequency reliability. In accordance with the invention, the method for evaluating quality of service in a wireless communications system provides billing data for potentially billing subscribers based upon resources expended to meet a target quality of service.

Third Embodiment of the Communications System

Figure 10:
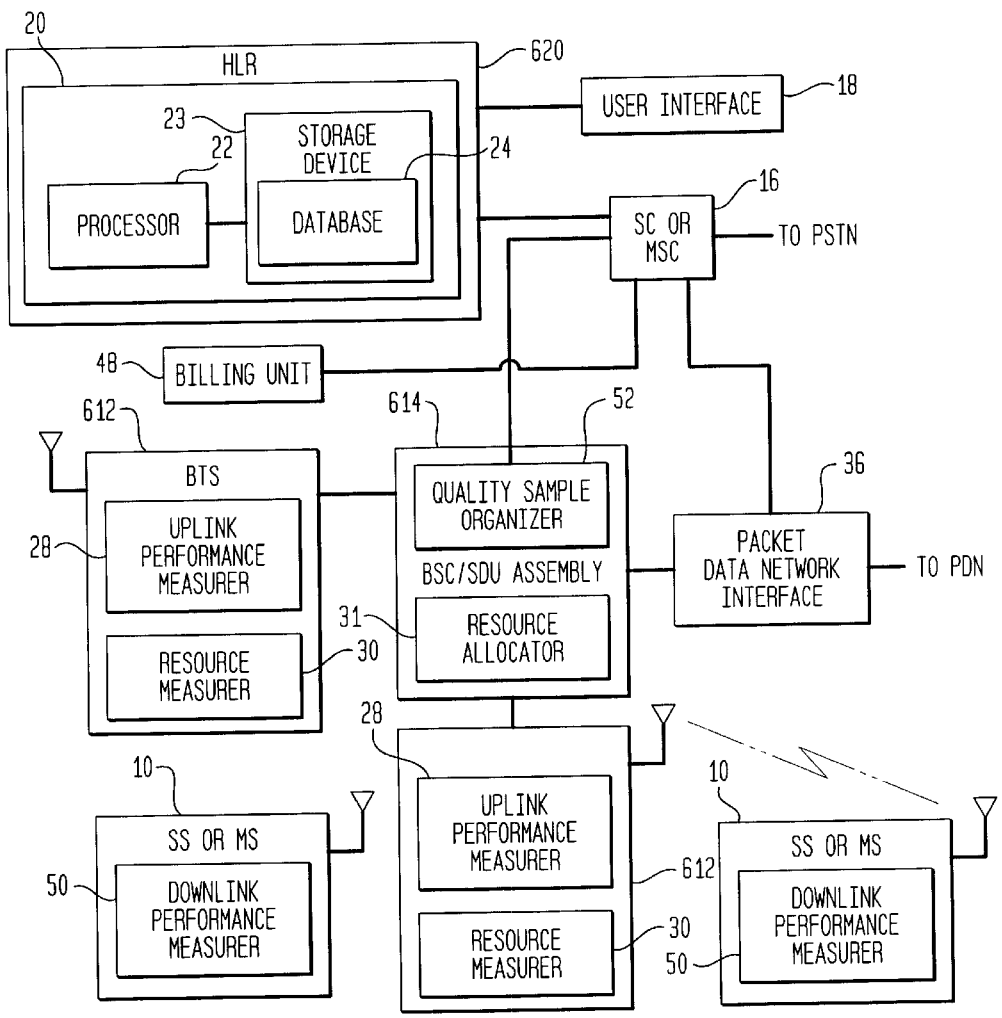
FIG. 10 is a block diagram of a third embodiment of a communications system in accordance with the invention.

The third embodiment of the communication system is shown FIG. 10. Like reference numbers in FIG. 10 indicate like components, which were previously described in conjunction with in FIG. 1 and FIG. 6. The third embodiment shown in FIG. 10 includes the following features: First, a data processing system 20 is integrated into a home location register (HLR) 620 for operator convenience and to reduce the costs of the communications system. Second, the billing unit 48 may comprise any commercially available billing unit 48 that interfaces with the MSC 16 and communicates with the HLR 620 via the MSC 16. Third, a base station controller assembly 614 incorporates the functionality of a selection distribution unit, especially where the communications system is a code-division-multiple-access (CDMA) or a spread-spectrum system. Finally, a packet data network interface 36 is coupled to the base station controller assembly 614 and the MSC 16 to provide an interface to a packet data network, a server, an internet server, or the like. The packet data network interface 36 may be required for packet data applications in cases where the MSC 16 does not independently support such packet data applications.

A base station controller assembly 614 includes a base station controller and a selection distribution unit (SDU). The selection distribution unit generally provides an interface between the base station subsystem and the mobile switching center 16. For example, in a reception direction the selection distribution unit decides the best frame to send to the mobile switching center 16 when the base stations 612 operate in a soft hand-off mode. In a transmit direction, the selection distribution unit distributes the same frame to a group of base stations 612.

The selection distribution unit handles multiplexing and signaling messages exchanged with the base station controller. The selection distribution unit preferably includes one or more power control algorithms for downlink and uplink paths. A distinct power control algorithm may be allocated for each subscriber unit. A Media Access Control (MAC) may be located in selection distribution unit. The MAC provides a potential interface to the quality sample organizer 52.

A home location register 620 (HLR) supports the mobility management of the MSC 16. Mobility management involves tracking the location of idle and/or active subscriber stations 10. The MSC 16 forwards registration messages from subscriber stations 10 to the home location register 620. In response to the registration messages, the home location register 620 sends user service profiles for particular subscriber stations 10 to the base station controller assembly 614.

The service profiles comprise parameter data on communication features that a subscriber has requested. The service profiles are accessed during call/connection and control to enable requested services of the subscriber stations 10. The fields of the service profile may include subscriber identity, target quality of service level, actual quality of service level, subscriber location, credit status, authorization period, and any enhanced communication features the subscriber has requested.

The HLR 620 allows the communications system to deliver calls, messages and services to subscribers regardless of their location in the communication system coverage area. In practice, the HLR 620 may communicate with another MSC located remotely from the communications system. Typically, a visitor location register (VLR) complements the HLR 620 to provide service for a subscriber station 10 that roams to a non-home or different MSC and registers for service.

The packet data network interface 36 is an interface between the SDU and the public circuit switched or packet data networks. The packet data network interface 36 preferably comprises an interworking function (IWF). The IWF is preferably used to provide packet data services over the communications system. In a preferred embodiment, the IWF provides the subscriber stations 10 with a gateway to the internet. For the internet application of the IWF, the IWF is first coupled to an IP (Internet Protocol) router and then the IP router is next coupled to the internet. In such a case, the IWF assigns IP addresses to corresponding subscriber stations 10. The IWF may also support packet data service by providing access to servers other than Internet servers.

The actual quality of service data in the HLR 620 are preferably accumulated, summarized, or averaged to provide a summary for a selected billing period. The HLR 620 can provide data to the billing unit 48 via the MSC 16. For example, the HLR 620 can service or form billing records for one or more subscribers in a manner similar to the data processing system of FIG. 1.

Examples of Methods for Evaluating Quality of Service

Figure 11:
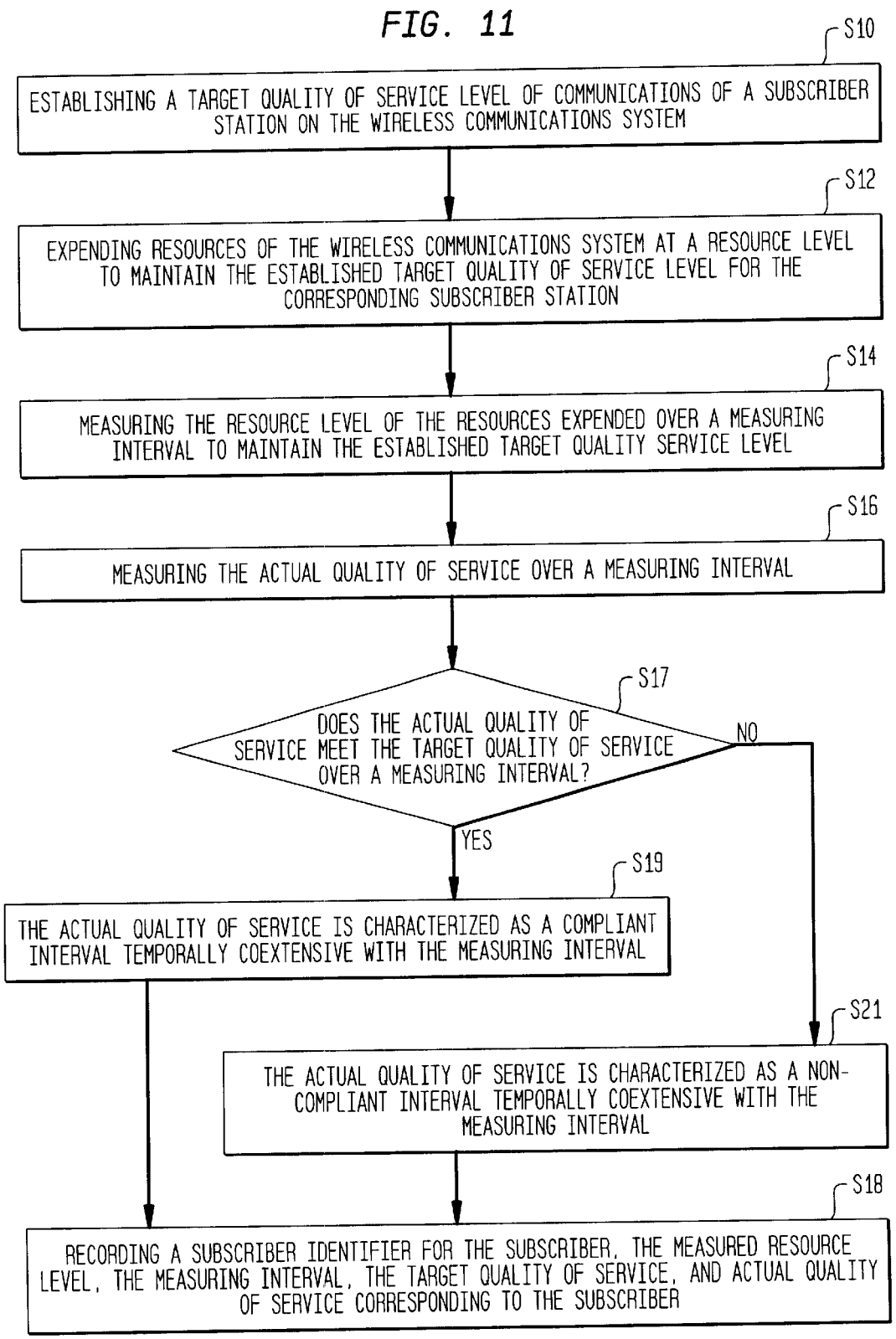
FIG. 11 through FIG. 15, inclusive, are flow charts illustrating examples of providing a quality of service evaluation to subscribers of a communication system in accordance with the invention.

The examples of the method for evaluating quality of service, which are illustrated in FIG. 11 through FIG. 15, may be applied to any of the foregoing embodiments of the communications system, including the first embodiment (FIG. 1), the second embodiment (FIG. 6), and the third embodiment (FIG. 10). FIG. 11 illustrates an example of the method for evaluating quality of service in a wireless communications system. In step S10, a user or operator of the communications system establishes a target quality of service level of communications of a subscriber station 10 on the wireless communications system.

The target quality of service in step S10 is better understood with reference to the four alternate examples. In a first example, the procedure of step S10 further comprises establishing a minimum bit-error-rate for the subscriber as the target quality of service level. In practice, a grade hierarchy of minimum bit-error-rates is made available such that a subscriber can select a suitable rate for the subscriber's application, budget, or preferences.

In a second example, the procedure of step S10 further comprises establishing a minimum bit-error-rate and a minimum frame error rate for the subscriber as the target quality of service level for the subscriber communicating over a voice channel. The minimum bit error rate is well-suited for subscribers using voice channels of a wireless communication system, that provides digital modulation, such as code-division-multiple-access. However, minimum bit error rates may be assigned to corresponding subscribers using data channels in a circuit switched or packet environment.

In third example, step S10 further comprises establishing a minimum packet size and a maximum packet scheduling delay corresponding to the minimum packet size as the target quality of service level for the subscriber communicating over a data channel.

In a fourth example, the procedure of step S10 further comprises establishing a minimum bit-error-rate, a minimum packet size, and a maximum packet scheduling delay corresponding to the minimum packet size as the target quality of service level for the subscriber communicating over a data channel. The fourth example is geared toward packet data transmissions and maintaining reliability of packet data transmissions over a wireless communications system.

After step S10 in step S12, the wireless communications system expends resources at a resource level to attempt to maintain the established target quality of service level for the corresponding subscriber station 10. In step S14, the resource level of the resources expended is measured. The resource level is measured over a measuring interval.

In step S16, an uplink performance measurer 28, a downlink performance measurer 50, or both measures the actual quality of service level over the measuring interval The measured resource level of step S14 tends to improve the accuracy or the robustness of the evaluation of the actual quality of service with respect to the target quality of service. The data processing assembly 20 can verify that the resource level data measured in step S14 is consistent with the actual performance level measured in step S16 during the same measuring interval. Accordingly, an operator may instruct the data processing assembly 20 to compare the resource level data measured in step S14 to the actual performance level data measured in step S16. If the resource level data is consistent with the performance level data for a subscriber over a measuring interval, the higher the resource use of the subscriber, the better the performance should be for the subscriber. If this relationship does not hold true or is not correlated properly, the dynamic nature of the communication system may dictate a billing procedure which more heavily weighs the subscriber's resource level data or the subscriber's actual performance level data in calculating a bill or billing record. Such billing decisions are ultimately left to the discretion of the operator for maximum flexibility.

Following step S16, the method continues with step S17. In step S17, the processing assembly 20 determines whether the actual quality of service meets the target quality of service over a measuring interval. The actual quality of service meets the target quality if the actual quality falls within a range defined as the target quality of service. As used herein, if the measured actual quality "equals" the target quality, the measured actual quality falls within the range. In a preferred embodiment, the range has an upper limit and a lower limit. However, in alternate embodiments, the range of the target quality may only have a lower limit or an upper limit. If in step S17 the processing assembly 20 determines that actual quality of service meets the target quality of service, in step S19 the actual quality of service is characterized as a compliant interval temporally coextensive with the measuring interval with respect to the target quality of service level. However, if in step S17 the processing assembly determines that the actual quality of service does not meet the target quality of service, in step S21 the actual quality of service is characterized as a noncompliant interval temporally coextensive with the measuring interval. Regardless of whether the actual quality of service is compliant or noncompliant, the method continues with step S18.

As shown in step S18, the method further comprises recording a subscriber identifier for the subscriber, the measured resource level, the measuring interval, the target quality of service (optional), and actual quality of service corresponding to the subscriber. Accordingly, the data processing system may identify unusable time of the subscriber by analyzing one or more measuring intervals, where the actual quality of service falls sufficiently below the target quality of service by a predetermined margin. The predetermined margin is selected to warrant the finding of an unusable measuring interval.

Figure 12:
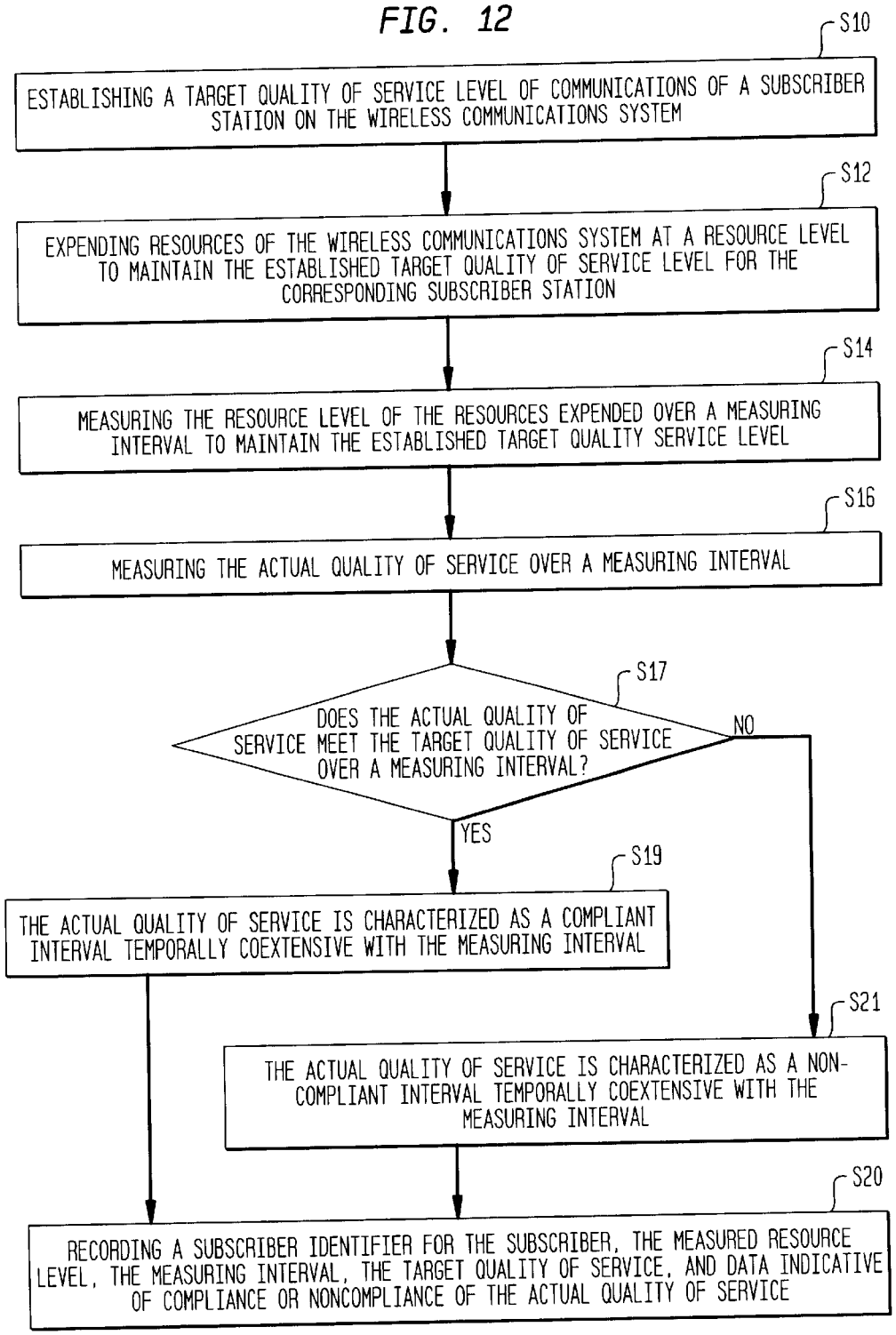

The example of FIG. 12 is similar to the example of FIG. 11, except FIG. 12 replaces step S18 of FIG. 11 with step S20. In step S20, the method comprises recording a subscriber identifier for the subscriber, the measured resource level, the measuring interval, the target quality of service, and data indicative of compliance or noncompliance of the actual quality of service.

Figure 13:
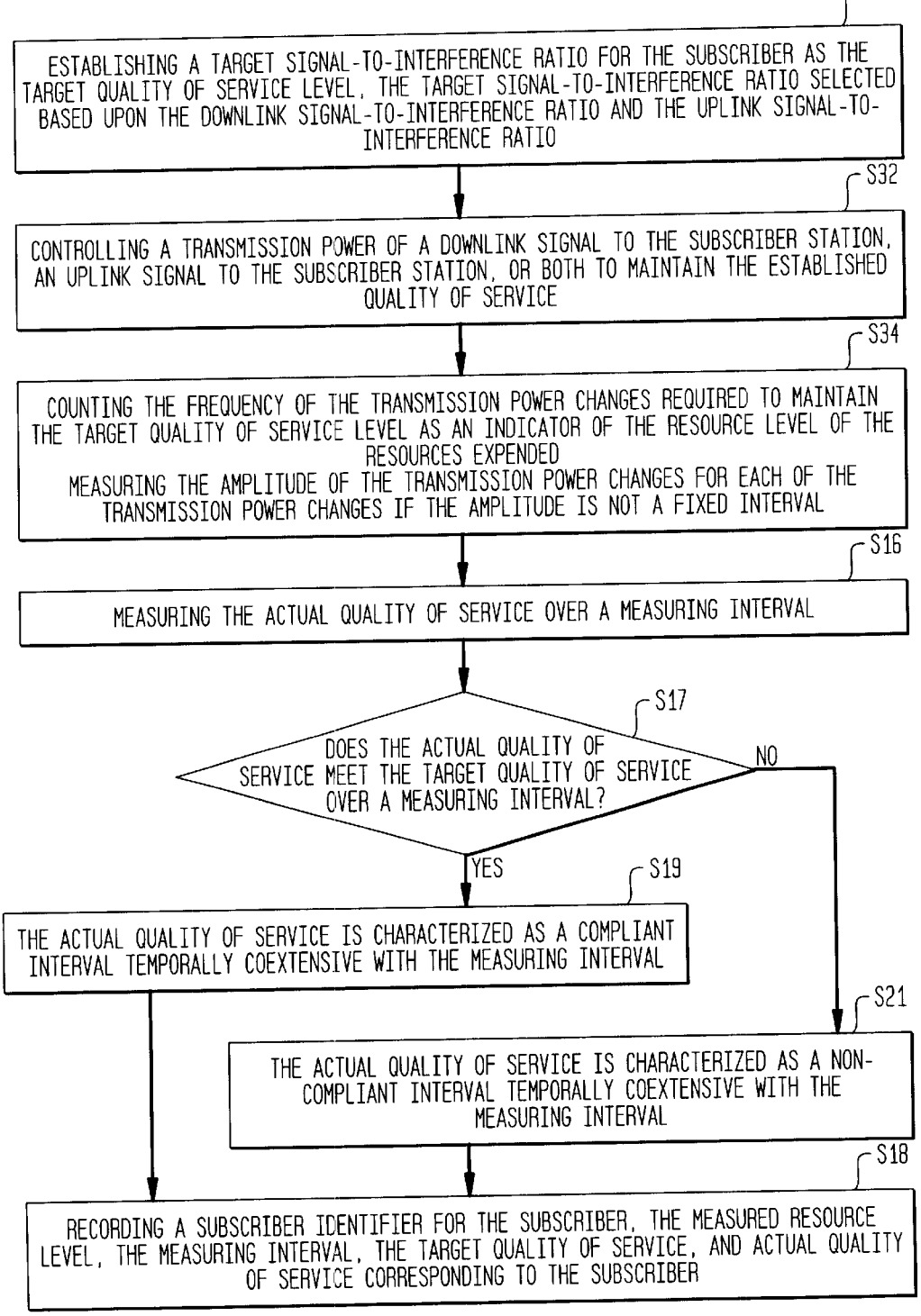

The example of FIG. 13 is similar to the example of FIG. 11 except that steps S10, S12, and S14 of FIG. 11 are replaced with steps S30, S32, and S34, respectively. In step S30, a user or communication system operator establishes a target quality of service level of communications of a subscriber station 10. In particular, the procedure of step S30 establishes a target signal-to-interference ratio (SIR) for the subscriber as the target quality of service level. The target signal-to-interference ratio preferably comprises an aggregate target including the downlink signal-to-interference ratio and the uplink signal-to-interference ratio.

In an alternate embodiment, the lowest signal-to-interference ratio between the uplink signal-to-interference ratio and the downlink signal-to-interference ratio is selected as the sole target signal-to-interference ratio, although in other examples the target signal-to-interference ratio may be based on the downlink SIR, the uplink SIR, a combination of the downlink SIR and uplink SIR, an average of the downlink SIR and the uplink SIR, or the like. As used herein, the signal-to-interference ratio is synonymous with the signal-to-noise ratio.

In step S32, the wireless communication system generally expends resources at a resource level to maintain the established target quality of service level for the corresponding subscriber station 10. The procedure of step S32 further comprises controlling a transmission power of a downlink signal to the subscriber station 10, an uplink signal from the subscriber station 10, or both to maintain the established quality of service set in step S30. Alternately, a different error control scheme may be used to maintain the established quality of service, either alone or in conjunction with a radio frequency power control scheme.

In general, the downlink signal to the subscriber station 10 has an adjustable transmission power used by the base station (e.g. 12 or 612). For example, if a communications system has one discrete power amplifier per base station, the bias of the power amplifier is preferably adjusted to control the power amplifier's gain; hence, the downlink power. Alternately, the driver amplifier associated with a corresponding communications channel and a corresponding subscriber is adjusted in gain to control the downlink power. The driver amplifier preferably feeds a broadband power amplifier for one or more base stations. The power control scheme may be integrated into the base station 612 as is typical in many commercially available cellular systems, such as CDMA systems.

In step S34, the communication system generally measures the resource level of the resources expended over a measuring interval to maintain the established target quality of service. In particular, the procedure of step S34 further includes counting the frequency of the transmission power changes required to maintain the target quality of service level as an indicator of the resource level of the resources expended. The measuring of the resource level in step S34 may comprise measuring the differential amplitude of the transmission power changes for each of the transmission power changes if the differential amplitude is not a fixed interval.

As the power level of the mobile station or the base station 612 is increased to meet a quality of service target, the power level of the mobile station may be adjusted in equal steps or intervals. The number of steps or iterations of power increases are tracked to derive a processing burden on the communications system. Subscribers which use the greatest number of steps may be accordingly billed at a highest rate, while subscribers which use the least number of steps may be billed at a lower rate. In some cases, the power steps are not uniform intervals. In such cases, the total change in power is measured during each power level change. The system may be configured only to note increases in power level or user of a power higher power level than a threshold for a select period of time or an interval. Such differential amplitude changes are measurements of the changes made by the communication system and should be distinguished from radio frequency propagational fluctuations for which the communications system does not compensate.

Figure 14:
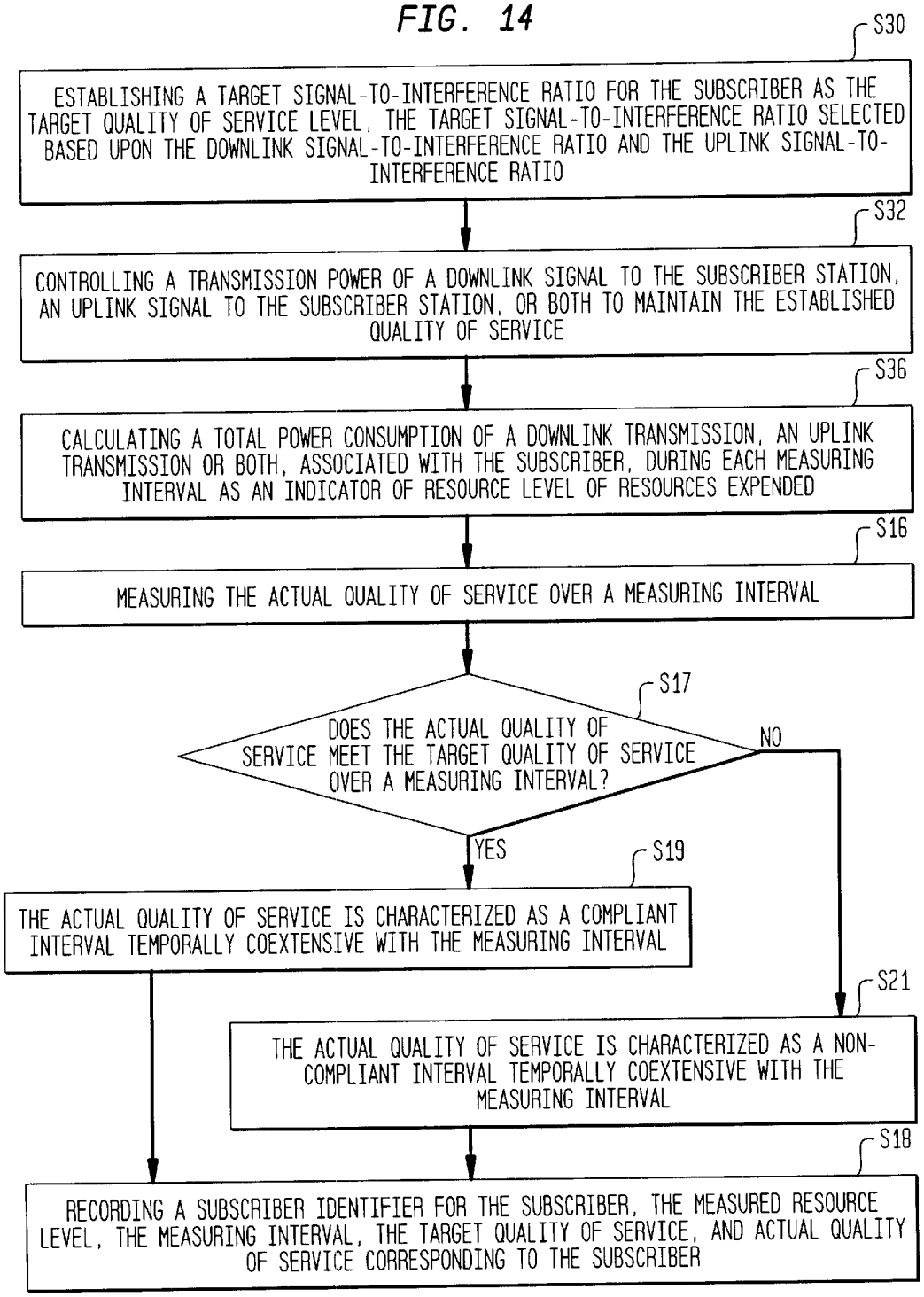

The example of FIG. 14 is similar to the example of FIG. 13, except that FIG. 14 replaces step S34 with step S36. In step S36, the communication system generally measures the resource level of the resources expended over a measuring interval to maintain the established target quality of service. In particular, the procedure of step S34 further includes calculating the a total power consumption of a downlink transmission, an uplink transmission, or both, associated with a subscriber, during each measuring interval as a indicator of resource level of resources expended. Such measuring of the total power is preferably executed by the base station subsystem, or a portion thereof.

Figure 15:
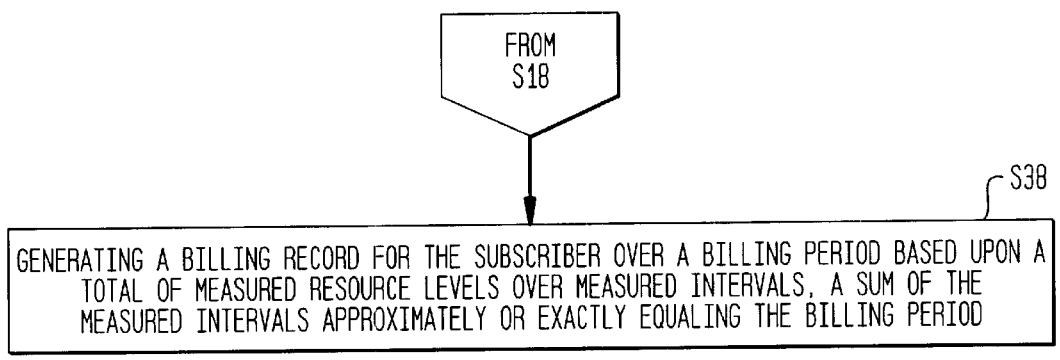

FIG. 15 illustrates an additional step S38 which may be added to any of the previous examples of FIG. 11, FIG. 13, and FIG. 14. Step S38 follows step S18. In step S38, the communications system generates a billing record for the subscriber over a billing period based upon a total of measured resource levels over measured intervals. A sum of the measured intervals approximately or exactly equals the billing period. A reduced billing rate may be established for measured intervals wherein the actual quality of service does generally not meet or exceed the target quality of service.

This specification describes various illustrative embodiments of the system and method of the present invention.

The scope of the claims is intended to cover various modifications and equivalent arrangements of the illustrative embodiments disclosed in the specification. Therefore, the following claims should be accorded the reasonably broadest interpretations to cover the modifications, equivalent structures, and features which are consistent with the spirit and scope of the invention disclosed herein.

I claim:

1. A method for evaluating quality of service for billing purposes in a wireless communications system, the method comprising the steps of:

establishing a target quality of service level of communications of a corresponding subscriber station on the wireless communications system;

expending resources of the wireless communications system at a resource level to attempt to maintain the established target quality of service level for the corresponding subscriber station;

measuring the actual quality service level provided over the measuring interval; and characterizing the measured actual quality of service with respect to the target quality of service level as a compliant interval or a non-compliant interval temporally coextensive with the measuring interval.

2. The method according to claim 1 further comprising the step of:

measuring the resource level of the resources expended over the measuring interval.

3. The method according to claim 2 further comprising the step of:

verifying the accuracy of the measured actual quality of service by comparing the measured actual quality of service to the measured resource level for the measuring interval.

4. The method according to claim 2 further comprising the step of:

recording a subscriber identifier for the subscriber, the measured resource level, the measuring interval, the target quality of service, and actual quality of service corresponding to the subscriber.

5. The method according to claim 2 further comprising the step of:

recording a subscriber identifier for the subscriber, the measured resource level, the measuring interval, the target quality of service, and data indicative of compliance or noncompliance of the actual quality of service from the characterizing step.

6. The method according to claim 1 wherein the establishing step further comprises:

establishing a worst case signal-to-interference ratio for the subscriber as the target quality of service level, the worst case signal-to-interference ratio selected from the downlink signal-to-interference ratio and the uplink signal-to-interference ratio.

7. The method according to claim 1 wherein the establishing step further comprises:

establishing a minimum bit-error-rate for the subscriber as the target quality of service level.

8. The method according to claim 1 wherein the establishing step further comprises:

establishing a minimum bit-error-rate and a minimum frame error rate for the subscriber as the target quality of service level for the subscriber communicating over a voice channel.

9. The method according to claim 1 wherein the establishing step further comprises:

establishing a maximum packet size and a maximum packet scheduling delay corresponding to the maximum packet size as the target quality of service level for the subscriber communicating over a data channel.

10. The method according to claim 1 wherein the establishing step further comprises:

establishing a minimum bit-error-rate, a minimum packet size, and a maximum packet scheduling delay corresponding to the minimum packet size as the target quality of service level for the subscriber communicating over a data channel.

11. The method according to claim 2 wherein the expending step comprises:

controlling a transmission power of a downlink signal to the subscriber station, an uplink signal to the subscriber station, or both to maintain the established quality of service.

12. The method according to claim 11 wherein the measuring of the resource level step comprises:

counting a frequency of transmission power changes required to maintain the target quality of service level as an indicator of the resource level of the resources expended.

13. The method according to claim 11 wherein the measuring of the resource level step comprises:

measuring an amplitude differential of the transmission power changes for each of the transmission power changes if the amplitude is not a fixed interval.

14. The method according to claim 11 wherein measuring the resource level step comprises:

calculating a total power consumption during each measuring interval as a indicator of resource level of resources expended.

15. The method according to claim 2 further comprising the step of:

generating a billing record for the subscriber over a billing period based upon a total of measured resource levels over measured intervals, a sum of the measured intervals approximately or exactly equaling the billing period.

16. The method according to claim 15 further comprising the step of:

establishing a billing record indicating measured intervals wherein the actual quality of service does generally not meet or exceed the target quality of service.

17. A wireless communication system comprising:

a user interface for establishing a target quality of service level of communications of a subscriber station on the wireless communications system;

a resource measurer for measuring the resource level of the resources expended over a measuring interval to maintain the established target quality service level;

a performance measurer for measuring the actual quality service level over the measuring interval to characterize the actual quality of service with respect to the target quality of service level as a compliant interval or a non-compliant interval temporally coextensive with the measuring interval.

18. The communications system according to claim 17 further comprising:

a data processing assembly for recording a subscriber identifier for the subscriber, the measured resource level, the measuring interval, the target quality of service, and actual quality of service corresponding to the subscriber.

19. The communications system according to claim 17 further comprising:
 a data processing assembly for recording a subscriber identifier for the subscriber, the measured resource level, the measuring interval, the target quality of service, and data indicative of compliance or noncompliance of the actual quality of service.

20. The communications system according to claim 17 wherein the resource measurer comprises a radio frequency signal strength meter.

21. The communications system according to claim 17 wherein the resource measurer comprises a spectrum analyzer.

22. The communications system according to claim 17 wherein the resource measurer comprises a counter receiving power level control data from a base station subsystem and counting a frequency of power level changes.

23. The communications system according to claim 17 wherein the resource measurer comprises a radio frequency power meter coupled to an integrator for summing the total power consumption of the downlink transmission to the subscriber, the uplink transmission from the subscriber, or both during the measuring interval.

24. The communications system according to claim 17 wherein the performance measurer comprises a tester selected from the group consisting of a bit-error rate tester and a frame-error rate tester.

25. The communications system according to claim 17 wherein the performance measurer comprises a first timer for measuring a packet interval and a second timer for measuring a packet scheduling delay between adjacent packet intervals for the subscriber.

26. The communications system according to claim 17 further comprising a resource allocator for expending resources of the communication system at a resource level associated with maintaining the established target quality of service level for the corresponding subscriber station.

27. The communications system according to claim 26 wherein the resource allocator controls at least one of the radio frequency power output and the receiver amplifier gain of the base station servicing said subscriber station.

28. A wireless communications system comprising:
 subscriber stations adapted to communicate with a base station, each subscriber station including a downlink performance measurer for measuring a signal quality parameter of a downlink signal path;
 a base station including an uplink performance measurer for measuring a signal quality parameter of an uplink signal path between the base station and an active one of the subscriber stations;
 a base station controller including a quality sample organizer receiving measured quality samples of the signal quality parameters from the downlink performance measurer and the uplink performance measurer;
 a user interface for defining a hierarchy of standard levels of quality of service, wherein each standard level corresponds to a range of quality of service; and
 a data processing assembly for recording quality of service information derived from the quality sample organizer and for determining compliance with the standard levels of quality of service, the data processing assembly coupled to the user interface.

29. The communications system according to claim 28 wherein the downlink performance measurer comprises a bit-error rate tester coupled to a demodulator output of one of the subscribers stations, the uplink performance measurer comprising a bit-error rate tester coupled to a demodulator output of the base station.

30. The communications system according to claim 28 wherein the downlink performance measurer comprises a bit-error rate tester, a first timer for measuring a duration of a packet interval, and a second timer for measuring a packet scheduling delay between adjacent packet intervals, such that the downlink performance measurer is capable of measuring packet data transmission performance over the wireless communications system.

31. The communications system according to claim 28 wherein the uplink performance measurer comprises a bit-error rate tester, a first timer for measuring a packet interval, and a second timer for measuring a packet scheduling delay between adjacent intervals, such that the uplink performance measurer is capable of measuring packet data transmission performance over the wireless communications system.

32. The communications system according to claim 28 wherein the uplink performance measurer and the downlink performance measurer measure the same signal quality parameter over a common measuring interval.

33. The communications system according to claim 28 wherein the quality of service information includes a subscriber identifier corresponding to a subscriber, the measuring interval, and the target quality of service corresponding to the subscriber.

34. The communications system according to claim 28 wherein the data processing assembly produces a quality of service record from the quality of service information, and further comprising a billing unit for billing subscribers based on the quality of service record available from the data processing assembly.

35. The communications system according to claim 28 wherein the data processing assembly is integrated into a home location register.

36. The communications system according to claim 26 wherein the resource allocator controls a transmission power of a downlink signal to the subscriber station, an uplink signal to the subscriber station, or both to maintain the established target quality of service.

37. The communications system according to claim 28 wherein said base station controller further includes a resource allocator for expending resources of the communication system at a resource level associated with maintaining the established target quality of service level for the corresponding subscriber station.

38. The communications system according to claim 37 wherein the resource allocator controls at least one of a radio frequency power output and a receiver amplifier gain of the base station servicing said subscriber station.

39. The communications system according to claim 37 wherein the resource allocator controls a transmission power of a downlink signal to the subscriber station, an uplink signal to the subscriber station, or both to maintain the established target quality of service.

40. The method according to claim 2 wherein the expending step comprises:
 controlling at least one of a radio frequency power output and a receiver amplifier gain of the base station servicing said subscriber station.

* * * * *